(12) United States Patent
Shamir et al.

(10) Patent No.: US 8,400,473 B2
(45) Date of Patent: Mar. 19, 2013

(54) MULTI-OPERATOR MEDIA RETARGETING

(75) Inventors: Ariel Shamir, Jerusalem (IL); Michael Rubinstein, Tel Aviv (IL)

(73) Assignees: Ariel Shamir, Jerusalem (IL); Interdisciplinary Center Herzliya, Herzliya (IL); Michael Rubinstein, Tel Aviv (IL)

( * ) Notice: Subject to any disclaimer, the term of this patent is extended or adjusted under 35 U.S.C. 154(b) by 938 days.

(21) Appl. No.: 12/490,341

(22) Filed: Jun. 24, 2009

(65) Prior Publication Data

US 2010/0328352 A1 Dec. 30, 2010

(51) Int. Cl.
*G09G 5/00* (2006.01)
(52) U.S. Cl. ........ 345/647; 345/660; 345/672; 345/649; 345/619; 345/620
(58) Field of Classification Search .................. 345/698, 345/699, 660, 672, 649, 619, 620
See application file for complete search history.

(56) References Cited

U.S. PATENT DOCUMENTS

| | | | |
|---|---|---|---|
| 5,557,689 A | 9/1996 | Huttenlocher et al. | |
| 2005/0057687 A1 | 3/2005 | Irani et al. | |
| 2007/0047841 A1* | 3/2007 | Berkner et al. | 382/298 |
| 2007/0237419 A1 | 10/2007 | Shechtman et al. | |
| 2008/0219587 A1 | 9/2008 | Avidan et al. | |
| 2008/0267528 A1* | 10/2008 | Avidan et al. | 382/276 |
| 2009/0208118 A1* | 8/2009 | Csurka | 382/228 |
| 2010/0177955 A1* | 7/2010 | Simakov et al. | 382/154 |

FOREIGN PATENT DOCUMENTS

WO 2008139465 A2 11/2008

OTHER PUBLICATIONS

Simakov et al. U.S. Appl. No. 60/917,109 of PGPub 20100177955, May 10, 2007.*
Simakov et al. U.S. Appl. No. 61/014,052 of PGPub 20100177955, Dec. 16, 2007.*
Simakov et al. "Summarizing visual data using bidirectional similarity", Computer Vision and Pattern Recognition, 2008. CVPR 2008. IEEE Conference on.*
Rubinstein, M., "Discrete Approaches to Content-Aware Image and Video Retargeting", M.Sc. Dissertation, Efi Arazi School of Computer Science, The Interdisciplinary Center, Herzliya, Israel, May 21, 2009.
Simakov et al., "Summarizing Visual Data Using Bidirectional Similarity", IEEE Conference on Computer Vision and Pattern Recognition, Anchorage, USA, Jun. 23-28, 2008.
Rubinstein et al., "Multi-Operator Media Retargeting", The Interdisciplinary Center, Herzliya, Israel, Jun. 17, 2009.
Avidan et al., "Seam Carving for Content-Aware Image Resizing", The 34th International Conference and Exhibition on Computer Graphics and Interactive Techniques, SIGGRAPH 2007, San Diego, USA, Aug. 5-9, 2007.

(Continued)

*Primary Examiner* — Michelle L Sams
(74) *Attorney, Agent, or Firm* — D. Kligler I.P. Services Ltd.

(57) ABSTRACT

A method for image processing includes receiving in a computerized image processor a source image having a source size and a definition of a target size that is different from the source size, and defining a plurality of different sequences of two or more different image retargeting operations that when applied to the source image, generates respective target images of the target size. The different sequences are automatically tested, using the image processor, by measuring respective similarities of the respective target images to the source image. One of the sequences is selected responsively to the similarities, and the selected one of the sequences is applied to the source image, using the image processor, in order to generate a target image.

15 Claims, 11 Drawing Sheets

OTHER PUBLICATIONS

Lei et al., "Direct Image Matching by Dynamic Warping", 2004 IEEE Conference on Computer Vision & Pattern Recognition Workshop, vol. 5, pp. 76, 2004.

Wolf et al., "Non-Homogeneous Content-Driven Video-Retargeting", Proceedings of the 11th IEEE International Conference on Computer Vision, pp. 1-6, Rio de Janeiro, Brazil, Oct. 14-20, 2007.

Sakoe et al., "Dynamic Programming Algorithm Optimization for Spoken Word Recognition", IEEE Transactions on Acoustics, Speech, and Signal Processing, vol. ASSP-26, No. 1, Feb. 1978.

Shamir et al., U.S. Appl. No. 12/490,344 "Image Comparison by Asymmetric Dynamic Warping" (not yet published), filed Jun. 24, 2009.

* cited by examiner

MULTI-OPERATOR MEDIA RETARGETING

FIELD OF THE INVENTION

The present invention relates generally to the field of image processing and more particularly relates to content-aware resizing.

BACKGROUND

Media retargeting has become an important problem due to the diversity of display devices and versatility of media sources for both images and video (i.e. media). In the context of the present patent application and in the claims, "retargeting" means changing the size or aspect ratio of an image or video without distorting key areas of interest. In this process, a retargeting operator (e.g., scaling or cropping) is applied to input media, thereby adapting the media to accommodate different display devices, varying across resolution and aspect ratios. The resulting target media size may be smaller or larger than the original. Simple methods that apply uniform scaling in one direction to the media can cause main objects to shrink or expand, and give a scene an unnatural appearance. Another common method is padding the content using margins (letterbox) while maintaining the media's original aspect ratio. Such methods do not really change the original size, and do not utilize the entire display space. Simple non-uniform scaling techniques apply some inverse Gaussian scaling kernel over the media, such that the borders are scaled more extensively than the middle, under the assumption that main objects tend to appear in the center of frames. However, this assumption is not always valid, and these simple techniques can cause distortions to the media.

Recently, a content-aware retargeting method (i.e. operator) was introduced, called seam carving, as described in U.S. Patent Application Publications US 2008/0219587 and 2008/0267528, whose disclosures are incorporated herein by reference. Seam carving operates on "seams", i.e. sequences of vertically, horizontally, or diagonally adjacent pixels that run from one side of the image to the other, one per column (for horizontal seams) or one per row (for vertical seams). Pixel importance is generally estimated by its contrast when compared with its neighbor pixels, but other measures may be used. Seam carving identifies seams comprising pixels of "less importance". Removing all pixels in a seam reduces the height or width of the image by one row or column. Repeated removal of seams can achieve any amount of shrinking. Conversely, seam carving can be adapted to image enlargement by duplicating the pixels in a seam.

SUMMARY OF THE INVENTION

There is thus provided, in accordance with an embodiment of the invention, a method for image processing, including receiving in a computerized image processor a source image having a source size and a definition of a target size that is different from the source size, defining a plurality of different sequences of two or more different image retargeting operations that when applied to the source image, generate respective target images of the target size, automatically testing, using the image processor, the different sequences by measuring respective similarities of the respective target images to the source image, selecting one of the sequences responsively to the similarities, and applying the selected one of the sequences to the source image, using the image processor, in order to generate a target image.

There is also provided in accordance with an embodiment of the invention, a method for video processing, including receiving in a computerized image processor a source video including a series of source frames having a source size and a definition of a target size that is different from the source size, segmenting the series into at least two key source frames and a plurality of secondary source frames between the key source frames, retargeting each of the key source frames to the target size, by the image processor, using respective first sequences of image retargeting operations including operators and operator parameters, creating one or more second sequences of the image retargeting operations for application to the secondary source frames by interpolating the operator parameters between the operator parameters of the first sequences, and retargeting the secondary source frames by applying the image retargeting operations in the second sequences to the secondary source frames.

There is further provided in accordance with an embodiment of the invention, a method for image comparison, including reading from a memory in a computerized image processor a source image and a target image, segmenting the source and target images, using the image processor, into respective pluralities of source and target arrays, respectively including source and target array elements, each array element including a matrix of one or more pixels from a respective image, each of the source arrays having a respective position in the source image, and each of the target arrays corresponding respectively to one of the source arrays based on the respective position, applying an asymmetric warping process between each of the source arrays and each of the respectively corresponding target arrays so as to compute respective array similarity scores, and combining the respective array similarity scores so as to compute an image similarity score of the target image with respect to the source image.

There is additionally provided in accordance with an embodiment of the invention, a method for image processing, including presenting on a display of a computer a source image having a source image size and a plurality of on-screen user interface controls that are respectively associated with different image retargeting operations, receiving user inputs to the computer defining a target image size and relative amounts of the different image retargeting operations to be applied to the source image, responsively to manipulation by the user of the user interface controls, and retargeting the source image by applying the different image retargeting operations in the defined amounts so as to generate a target image of the target image size.

There is moreover provided in accordance with an embodiment of the invention, a computer program product for image processing, the computer program product including a computer usable medium having computer usable code embodied therewith, the computer usable program code including computer usable code configured for receiving a source image having a source size and a definition of a target size that is different from the source size, computer usable code configured for defining a plurality of different sequences of two or more different image retargeting operations that when applied to the source image, generate respective target images of the target size, computer usable code configured for automatically testing the different sequences by measuring respective similarities of the respective target images to the source image, computer usable code configured for selecting one of the sequences responsively to the similarities, and computer usable code configured for applying the selected one of the sequences to the source image in order to generate a target image.

There is moreover provided in accordance with an embodiment of the invention, a computer program product for image processing, the computer program product including a computer usable medium having computer usable code embodied therewith, the computer usable program code including computer usable code configured for receiving a source image having a source size and a definition of a target size that is different from the source size, computer usable code configured for defining a plurality of different sequences of two or more different image retargeting operations that when applied to the source image, generate respective target images of the target size, computer usable code configured for automatically testing the different sequences by measuring respective similarities of the respective target images to the source image, computer usable code configured for selecting one of the sequences responsively to the similarities, and computer usable code configured for applying the selected one of the sequences to the source image in order to generate a target image.

There is also provided in accordance with an embodiment of the invention, a computer program product for video processing, the computer program product including a computer usable medium having computer usable code embodied therewith, the computer usable program code including computer usable code configured for receiving a source video comprising a series of source frames having a source size and a definition of a target size that is different from the source size, computer usable code configured for segmenting the series into at least two key source frames and a plurality of secondary source frames between the key source frames, computer usable code configured for retargeting each of the key source frames to the target size, using respective first sequences of image retargeting operations comprising operators and operator parameters, computer usable code configured for creating one or more second sequences of the image retargeting operations for application to the secondary source frames by interpolating the operator parameters between the operator parameters of the first sequences, and computer usable code configured for retargeting the secondary source frames by applying the image retargeting operations in the second sequences to the secondary source frames.

There is further provided in accordance with an embodiment of the invention, a computer program product for image comparison, the computer program product including a computer usable medium having computer usable code embodied therewith, the computer usable program code including computer usable code configured for reading from a memory a source image and a target image, computer usable code configured for segmenting the source and target images into respective pluralities of source and target arrays, respectively comprising source and target array elements, each array element comprising a matrix of one or more pixels from a respective image, each of the source arrays having a respective position in the source image, and each of the target arrays corresponding respectively to one of the source arrays based on the respective position, computer usable code configured for applying an asymmetric warping process between each of the source arrays and each of the corresponding target arrays so as to compute respective array similarity scores, and computer usable code configured for combining the respective array similarity scores so as to compute a respective image similarity scores of the target images with respect to the source image.

There is additionally provided in accordance with an embodiment of the invention, a computer program product for image processing, the computer program product including a computer usable medium having computer usable code embodied therewith, the computer usable program code including computer usable code configured for presenting on a display of a computer a source image having a source image size and a plurality of on-screen user interface controls that are respectively associated with different image retargeting operations, computer usable code configured for receiving user inputs to the computer defining a target image size and relative amounts of the different image retargeting operations to be applied to the source image, responsively to manipulation by the user of the user interface controls, and computer usable code configured for retargeting the source image by applying the different image retargeting operations in the defined amounts so as to generate a target image of the target image size.

There is moreover provided in accordance with an embodiment of the invention, an image processing apparatus, including a memory, and an image processor, which is configured to receive into the memory a source image having a source size and a definition of a target size that is different from the source size, define a plurality of different sequences of two or more different image retargeting operations that when applied to the source image, generate respective target images of the target size, automatically test the different sequences so as to measure respective similarities of the respective target images to the source image, select one of the sequences responsively to the similarities, and apply the selected one of the sequences to the source image, in order to generate a target image.

There is also provided in accordance with an embodiment of the invention, a video processing apparatus, including a memory, and an image processor, which is configured to receive into the memory a source video comprising a series of source frames having a source size and a definition of a target size that is different from the source size, segment the series into at least two key source frames and a plurality of secondary source frames between the key source frames, retarget each of the key source frames to the target size, using respective first sequences of image retargeting operations comprising operators and operator parameters, create one or more second sequences of the image retargeting operations for application to the secondary source frames by interpolating the operator parameters between the operator parameters of the first sequences, and retarget the secondary source frames by applying the image retargeting operations in the second sequences to the secondary source frames.

There is further provided in accordance with an embodiment of the invention, an image comparison apparatus, including a memory, and an image processor, which is configured to read from the memory a source image and a target image, segment the source and target images into respective pluralities of source and target arrays, respectively comprising source and target array elements, each array element comprising a matrix of one or more pixels from a respective image, each of the source arrays having a respective position in the source image, and each of the target arrays corresponding respectively to one of the source arrays based on the respective position, apply an asymmetric warping process between each of the source arrays and each of the respectively corresponding target arrays so as to compute respective array similarity scores, and combine the respective array similarity scores so as to compute an image similarity score of the target image with respect to the source image.

There is additionally provided in accordance with an embodiment of the invention, an image processing apparatus, including a display, and an image processor, which is configured to present on the display a source image having a source image size and a plurality of on-screen user interface controls that are respectively associated with different image retargeting operations, receive user inputs defining a target image size and relative amounts of the different image retargeting operations to be applied to the source image, responsively to manipulation by the user of the user interface controls, and retarget the source image by applying the different image retargeting operations in the defined amounts so as to generate a target image of the target image size.

BRIEF DESCRIPTION OF THE DRAWINGS

The invention is herein described, by way of example only, with reference to the accompanying drawings, wherein.

DETAILED DESCRIPTION OF EMBODIMENTS

Notation Used Throughout

Figure 1:
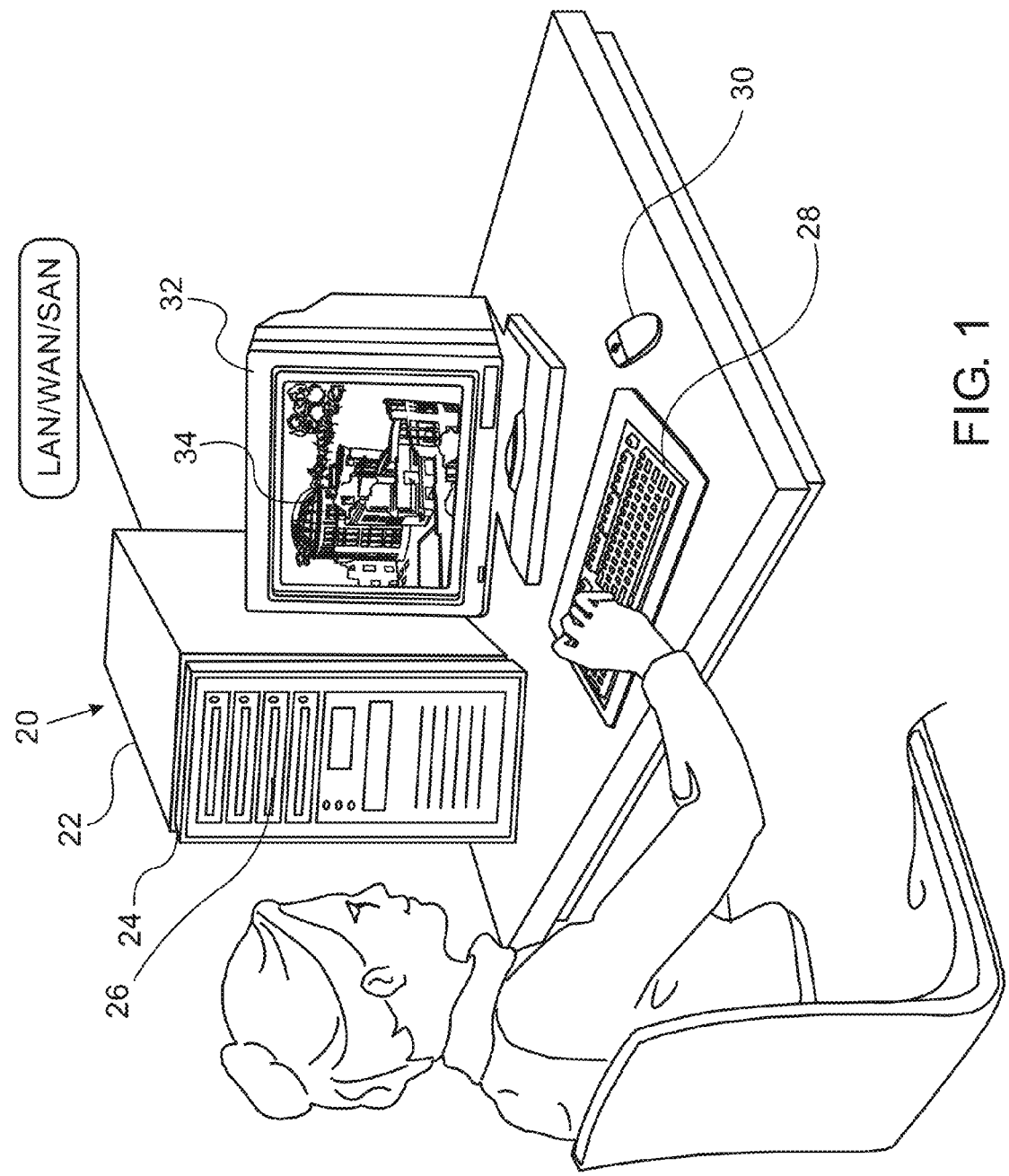
FIG. 1 is a diagram illustrating an example computer processing system for multi-operator image and video retargeting, in accordance with an embodiment of the present invention.

The following notation is used throughout this document:

| Term | Definition |
| --- | --- |
| A-DTW | Asymmetric Dynamic Time Warping |
| ASCII | American Standard Code for Information Interchange |
| ASIC | Application Specific Integrated Circuit |
| CD-ROM | Compact Disc Read Only Memory |
| CPU | Central Processing Unit |
| CR | Cropping |
| D | Dimensional |
| DSP | Digital Signal Processor |
| DPW | Dynamic Plane Warping |
| DTW | Dynamic Time Warping |
| EEROM | Electrically Erasable Read Only Memory |

-continued

| Term | Definition |
| --- | --- |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| SAN | Storage Area Network |
| SC | Seam Carving |
| SL | Scaling |
| URL | Uniform Resource Locator |
| WAN | Wide Area Network |

Overview

In many instances, performing a combination of retargeting operations on a source image will yield a target image superior to a target image resulting from a single retargeting operation. Examples of a combination of retargeted imaging operations include scaling followed by cropping or cropping followed by seam carving followed by scaling. Embodiments of the present invention employ a resizing space as a conceptual multi-dimensional space combining several retargeting operators. Each axis in this space corresponds to a particular type of operator, and a point in this space corresponds to a particular target image size. A path in this space defines a sequence of operations that retargets an image to a particular size. While there are many paths to a point in the space (i.e. sequences of retargeting operations to retarget an image to a particular size), not all paths give the same results. This is due to the fact that resizing operators are not commutative (for example, scaling followed by cropping is different from cropping followed by scaling). Although scaling, seam carving and cropping are presented here by way of example, other types of retargeting operations can be used in the context of these methods. Examples include non-homogeneous scaling (as described, for instance, by Lior Wolf et al., in "Non-Homogeneous Content-Driven Video-Retargeting," Proceedings of the Eleventh IEEE International Conference on Computer Vision, pages 1-6, 2007, whose disclosure is incorporated herein by reference), image warping, and segmentation and recomposition.

Some embodiments of the present invention enable retargeting of electronic images from a first size (defined by the number of pixels and aspect ratio of the image) to a second size by applying different retargeting operators to the input image in sequence. Using various retargeting operators (e.g., cropping, scaling and seam carving), image distance may be measured automatically between the source image and each retargeted image at its respective position in the multi-dimensional space, in order to choose the best retargeting operator to use at each step in retargeting a source image to a target image. In addition, image retargeting methods in accordance with embodiments of the present invention can be applied to retargeting full motion video by applying optimal operators to key frames of the video, and interpolating operator values to retarget frames in between key frames.

The image retargeting methods that are described herein can be performed either manually (i.e. under operator control) or automatically, with an image retargeting system determining an optimal sequence of retargeting operation. An embodiment of the present invention provides a novel multi-operator user interface which enables users to interactively combine multiple operators to a source image.

Another embodiment of the present invention provides a superior method of measuring a distance between two digital images, called bi-directional warping (BDW). This method is particularly useful in measuring image distances as part of the automated image retargeting method described above, but it can also be used in other image matching applications. BDW compares two images by segmenting the two images into an equivalent number of arrays (i.e. rows or columns). First, each element of each first image array is matched to an element with the least image distance in a corresponding array of the second image. Each element of each second image array is then matched to an element with the least image distance in a corresponding array of the first image. An image distance score is then calculated based on the distance score of each matched element.

When matching array elements of a first array to elements of a second array, the image comparison method described herein allows more than one element of the first array to be matched to a single element of the second array. At the same time, the method does not require all elements in the second array have a match from a first array element. This feature enables comparison of images with differing aspect ratios and resolution, including images from which blocks of pixels have been removed by techniques such as seam carving.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, a tangible storage medium, such an electronic, magnetic or optical memory device. Alternatively, the medium may comprise an electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic pictorial illustration of an example image retargeting system 20, in accordance with an embodiment of the present invention. System 20 comprises a processor 22 which may comprise a digital signal processor (DSP), central processing unit (CPU), microcontroller, microprocessor, microcomputer, ASIC or FPGA core. The system also comprises a static read only memory and a dynamic main memory 24 all in communication with the processor. The processor is also in communication, via a bus, with a number of peripheral devices that are also included in the computer system. Peripheral devices coupled to the bus include a display device 32 (e.g., monitor) displaying a user interface 34 implementing an embodiment of the present invention, alphanumeric input device 28 (e.g., keyboard) and pointing device 30 (e.g., mouse, tablet, etc.)

The computer system is connected to one or more external networks 36, such as a LAN or WAN, by communication lines connected to the system via a data I/O communications interface (e.g., network interface card). The data I/O communications interface enables the data processing system to become coupled to other data processing systems or remote printers or storage devices through intervening private or public networks. Modems, cable modem and Ethernet cards are just a few of the currently available types of network adapters. The system also comprises a magnetic or semiconductor-based storage device 26 for storing application programs and data. Device 26 may include any suitable memory means, including but not limited to, magnetic storage, optical storage, semiconductor volatile or non-volatile memory, biological memory devices, or any other memory storage device.

Software adapted to implement the functions described herein may reside on a tangible computer readable storage medium, such as a magnetic disk within a disk drive unit. Alternatively, the computer readable medium may comprise a floppy disk, removable hard disk, flash memory, EEROM based memory, bubble memory storage, ROM storage, distribution media, intermediate storage media, execution memory of a computer, and any other medium or device capable of storing for later reading by a computer a computer program implementing such functions. The software may also reside, in whole or in part, in the static or dynamic main memories or in firmware within the processor of the computer system (i.e. within microcontroller, microprocessor or microcomputer internal memory).

Although FIG. 1 shows a particular computer system configuration, other digital computer system configurations can also be employed to implement embodiments of the present invention, and are thus considered to be within the spirit and scope of this invention.

Once they are programmed to perform particular functions pursuant to instructions from program software that implements an embodiment of this invention, such digital computer systems in effect become special-purpose computers particular to this invention.

Computer programs implementing the system and methods described hereinbelow will commonly be distributed to users on a distribution medium such as floppy disk or CD-ROM or may be downloaded over a network such as the Internet using FTP, HTTP, or other suitable protocols. From there, such programs will often be copied to a hard disk or a similar intermediate storage medium. When the programs are to be run, they will be loaded either from their distribution medium or their intermediate storage medium into the execution memory of the computer, configuring the computer to act in accordance with an embodiment of this invention. All these operations are well-known to those skilled in the art of computer systems.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Multi-Operator Image Retargeting

Figure 2:
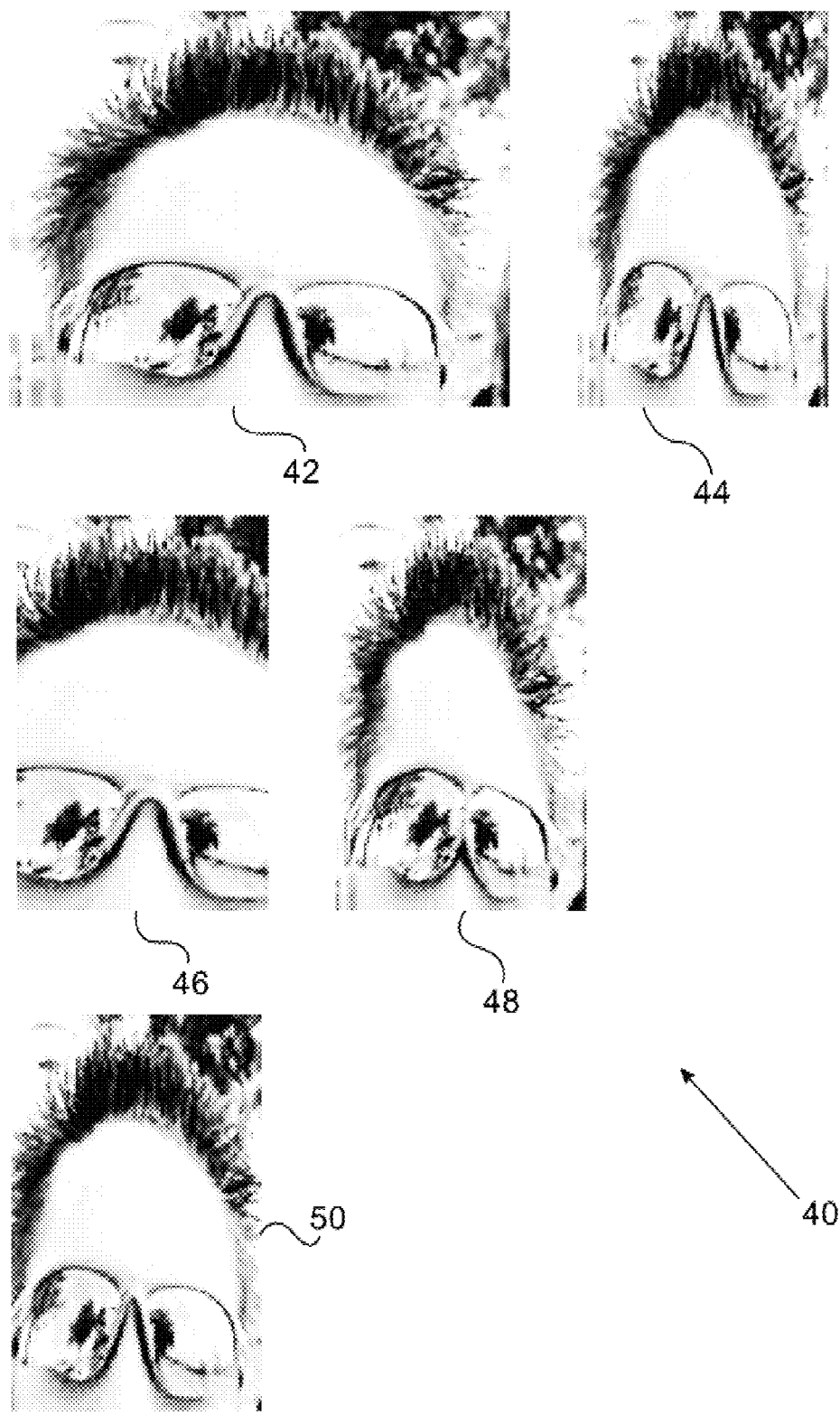
FIG. 2 is a series of images illustrating the results of single operator image retargeting operations and multi-operator image retargeting in accordance with an embodiment of the present invention.

FIG. 2 is a series 40 of images illustrating image retargeting results retargeted using both single retargeting operators as well as a multiple operators in accordance with an embodiment of the present invention. The series comprises a source image 42, a target image retargeted by scaling 44, a target image retargeted by cropping 46, a target image retargeted by seam carving 48 and a target image retargeted by multiple operators (in this case, combining cropping, scaling and seam carving) 50. Note that retargeted images 44, 46, 48 and 50 all have the same aspect ratio. Retargeted images 44, 46 and 48 (i.e. source images retargeted using only one retargeting operator) show clear image distortion in comparison to source image 42. Combining cropping, scaling and seam carving in accordance with an embodiment of the present invention, retargeted image 50 achieves superior results both subjectively, in the eyes of a human observer, and objectively, when measured against the source image using BDW in accordance with an embodiment of the present invention.

Combining several operators together in an ordered sequence is a multi-operator sequence. Note that a certain type of operator can appear multiple times in different places in the sequence; in some it can be used to enlarge the image and in others to reduce it (i.e. when not limited to monotonic paths), and also in different directions (width and height).

For a set of retargeting operators, a resizing space is defined as follows: For a given image I of size (w,h), the resizing space $\Phi$ is defined as the space spanned by any subset of n types of retargeting operators, each one possibly in two directions—width and height. Hence, the dimension of this space is at most 2n. A multi-operator sequence defines a directed path in this space beginning at the origin and following the operator sequence along the path using integer steps. One step in the operator sequence is equivalent to a step either in the positive or negative direction of the respective operator axis, which can change either the width or the height of the image. Since only integer steps are used, the resizing space is treated as a lattice rather than a continuous space.

A point on this lattice $p \in \Phi$, $p=(p_1, \ldots, p_n)$, $p_i \in \mathbb{Z}$, represents the set of images $\{I'\}$ whose dimensions are (w',h') wherein $w'=w+\Sigma_i p_i^w$ and $h'=h+\Sigma_j p_x^h$, and $p_i^w, p_j^h$ are the coordinates in $(p_1, \ldots, p_k)$ representing operators that change the width or height respectively. These coordinates can be positive or negative to signify enlarging or reduction of size. There are an infinite number of such images for each point p in the resizing space since there are an infinite number of paths starting at the origin and ending at p. All such paths define multi-operator sequences in which the change of width or height by each specific operator i is fixed and amounts to the coordinate $p_i$. However, the order of applying the operators can be different. Additionally, there is an infinite number of points $q \in \Phi$ that represent images whose dimensions (w', h') are the same. In fact these points lie on a hyper-plane in the resizing space, and the difference between them is that the amount of applying specific operators (i.e. the ratio between them) changes. Subsystem 62 attempts (manually via module 70, or automatically via module 72) to find the best path from the origin to one of these points, subject to some global image similarity function between the source and target images.

When automatically retargeting an image using the multi-operator image retargeting methods described herein, the goal is to find the best order and combination of operators for the desired target image size. Suppose the goal is to reduce the width w of source image S by m pixels, using a collection of n operators $\{O_1, \ldots, O_n\}$, and given some similarity measure $D(\ )$ (e.g., BDW). In this case, module 72 seeks a target image T of width w'=w−m that minimizes D (S, T). Even if module 72 uses only monotonic sequences (i.e., it does not reduce, then extend, then reduce back again), there are still $O(n^m)$ different multi-operator sequences that retarget S to width w'. This means that the search space is exponential in the size change m.

To limit the mixed path search space, module 72 may assume that the ratio of operators in a mixed sequence (i.e. the total amount each one is used) is more important than their order in the sequence. This leads to a dynamic programming formulation of the problem, as shown hereinbelow in FIG. 4. In the search, module 72 always keeps just one representative for each sequence with a given ratio of operators, as represented by the point $(p_1, \ldots, p_n)$ in resizing space, wherein $p_i$, the coordinate for operator i, denotes the total number of times of applying operator i. Module 72 stores the optimal cost and optimal sequence $\sigma(p_1, \ldots, p_n)$ for each such point in a dynamic programming table, including the order of applying all the operators for this representative point. The cost of each image is calculated by measuring its distance from the source image, as described above.

As discussed supra, embodiments of the present invention employ a resizing space as a conceptual multi-dimensional space combining several retargeting operators. There are potentially an infinite number of paths in the multi-operator space that can be used to retarget an image. Practical applications of retargeting, however, typically (i.e. but not necessarily) use monotonic paths, i.e. paths on which all operators either increase the size of the image, or decrease it, but not both. Even so, there is still an exponential number of possible monotonic paths. Of all the monotonic paths, there are two types of paths, termed regular and mixed. Mixed paths can contain the operators in any sequence. A regular path is composed of consecutive single-operator sequences, one per operator (e.g., by first applying seam carving, then cropping and finally scaling). In this case, the issue that needs to be addressed is the number of times each operator is to be applied in the retargeting process.

For regular paths, the search space is polynomial in the image size and can be enumerated to find the optimal regular path. On the other hand, in a mixed path, the order of the operations, as well as the number of times each operator is used, is not fixed. Hence, the search space is exponential in the image size. However, using a simple assumption, it is possible to use a polynomial algorithm, as described hereinbelow, to automatically determine the optimal mixed multi-operator path. In all cases, the search space is exponential in the number of retargeting operators. Nevertheless, the number of operators is typically small (say, three or four operators), making the solutions tractable.

The multi-operator retargeting methods that are described hereinbelow can work automatically with various image similarity (i.e. distance) measures as well as different retargeting operators. Alternatively or additionally, both regular and mixed paths can also be controlled by the user, and user interfaces that can be used for this sort of image retargeting are shown below. In some embodiments, the regular path approach is extended to video retargeting by interpolating paths between key frames. This approach provides the flexibility to use the best combination of operators at different times in the video.

Figure 3:
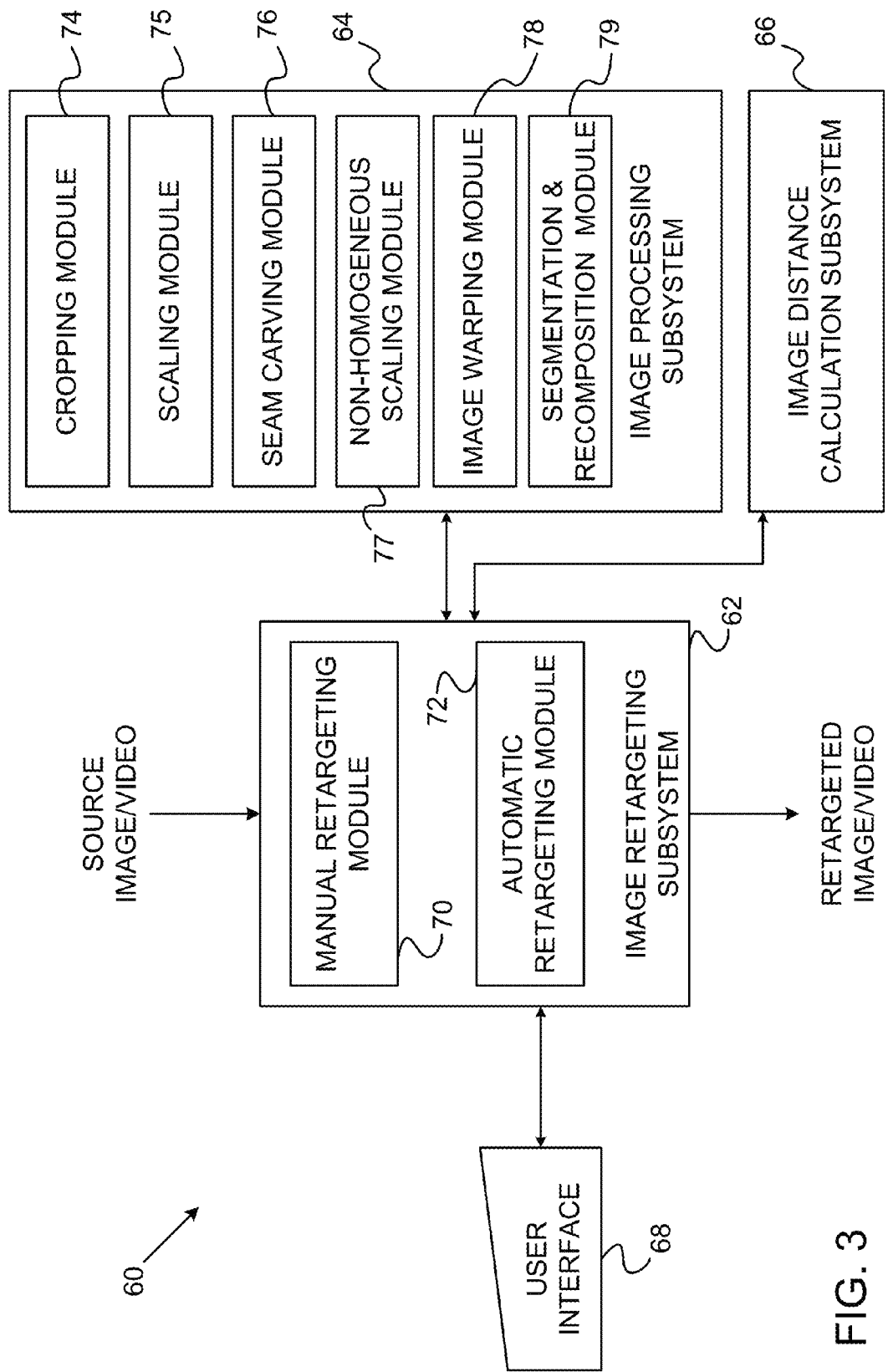
FIG. 3 is a block diagram illustrating functional components of a system for multi-operator image retargeting, in accordance with an embodiment of the present invention

FIG. 3 is block diagram 60 that schematically illustrates functional components of image retargeting system 20, in accordance with an embodiment of the present invention. As noted above, these components are typically implemented as software processes running on processor 22. The system comprises an image retargeting subsystem 62, an image processing subsystem 64, an image distance calculation subsystem 66 and a user interface 68 which is displayed on display device 32, and controlled by input device 28 and pointing device 30. Image retargeting subsystem 62 comprises either a manual image retargeting module 70 or an automatic image retargeting module 72, or both (as shown in the figure). In the embodiment shown in the figure, image processing subsystem 64 comprises a cropping module 74, a scaling module 75, a seam carving module 76, a non-homogeneous scaling module 77, an image warping module 78, and a segmentation and recomposition module 79. These modules are shown by way of example, and system 20 may actually use only a subset of the modules. Additionally or alternatively, the system can include other operator modules, as are known in the art.

Figure 6:
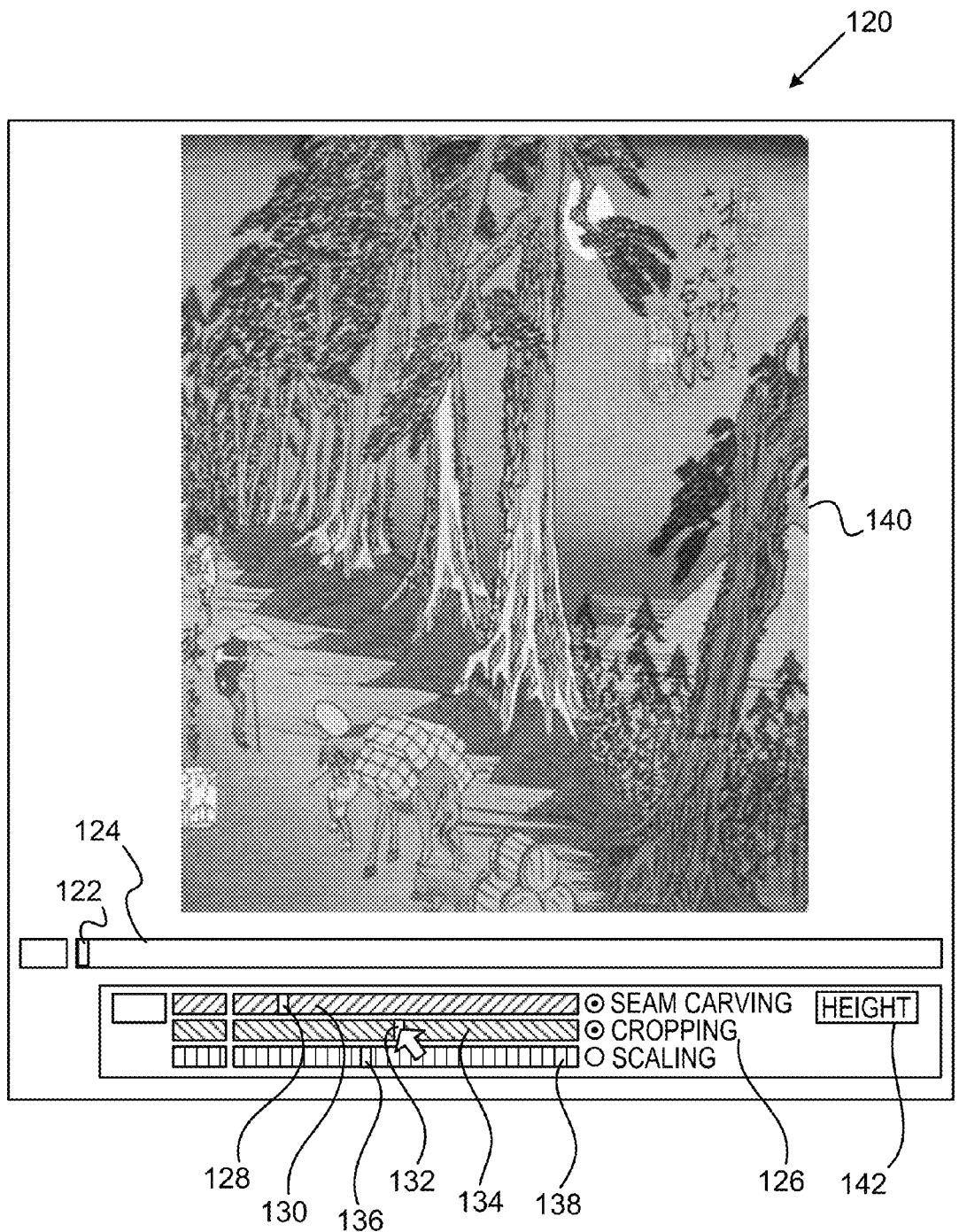
FIG. 6 is a multi-operator user interface in accordance with an embodiment of the present invention.
Figure 7:
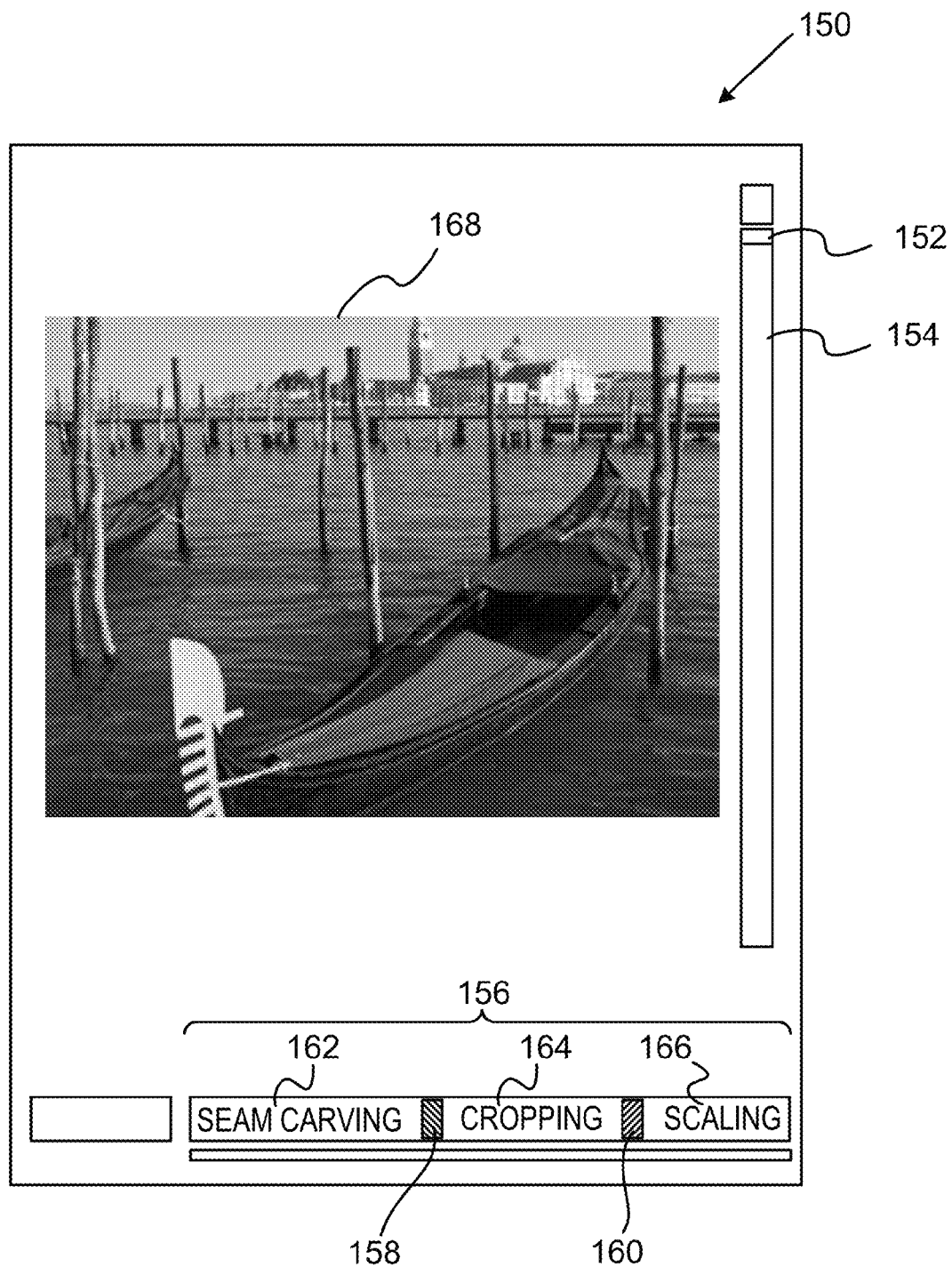
FIG. 7 is a multi-operator user interface in accordance with another embodiment of the present invention.

In operation, image retargeting subsystem 62 receives an original image. Retargeting parameters are typically entered via the user interface, although this information can be determined automatically as well. To automatically retarget the original image, the automatic image retargeting subsystem uses subsystem 64 to perform such tasks as cropping, scaling and seam carving (using their respective modules) and populates the multi-dimensional space with multiple potential target images. After each image processing operation is performed, image distance calculation subsystem 66 calculates the distance between the source and each resulting processed image. Using the distance scores, the automatic image retargeting subsystem selects the most similar image (i.e., the image with the smallest distance). Alternatively or additionally, manual changes to the image can be performed via user interface 68, which interacts directly with the manual image retargeting subsystem, which in turn, interacts with the image processing subsystem. Methods of automatic image retargeting are described hereinbelow with reference to FIGS. 4 and 5, and user interfaces for manual image retargeting are shown in FIGS. 6 and 7.

For both automatic and manual multi-operator image retargeting, a retargeting operator O is defined as a procedure that reduces or enlarges an image either in its width or its height, or both, while preserving its rectangular shape (but not necessarily preserving all of the image content). System 60 uses retargeting operations that are discrete and separable (in dimension). Examples of retargeting operations that can be used in system 60 include, without limitation, bi-cubic scaling, cropping and seam carving. The atomic retargeting operation in subsystem 62 is adding or removing one pixel to the width or the height of the image. Two-dimensional resizing can be treated as a sequence of width and height resizing, which means that different operators can be used for different dimensions (e.g., use scaling for height change and seam carving for width change). Alternatively or additionally, two-dimensional operators may be used.

Not all retargeting operators can actually support enlarging. For instance, cropping is usually used only for reducing image size. However, for the sake of completeness cropping is defined as adding a black frame to an image (letter-boxing). Similarly, to make cropping separable, image processing subsystem 64 removes rows or columns from the image borders independently. Image processing subsystem 64 also chooses the sides separately, for instance, either the left or the right column is removed depending on which has the lower cost, in terms of distance of the resulting image from the source image. Scaling can support separable and discrete resizing, but scaling an image by one pixel k-times is inferior to scaling by k at once. Hence, whenever applicable, subsystem 62 performs a scale by k instead of applying k 1-pixel scalings.

Figure 4:
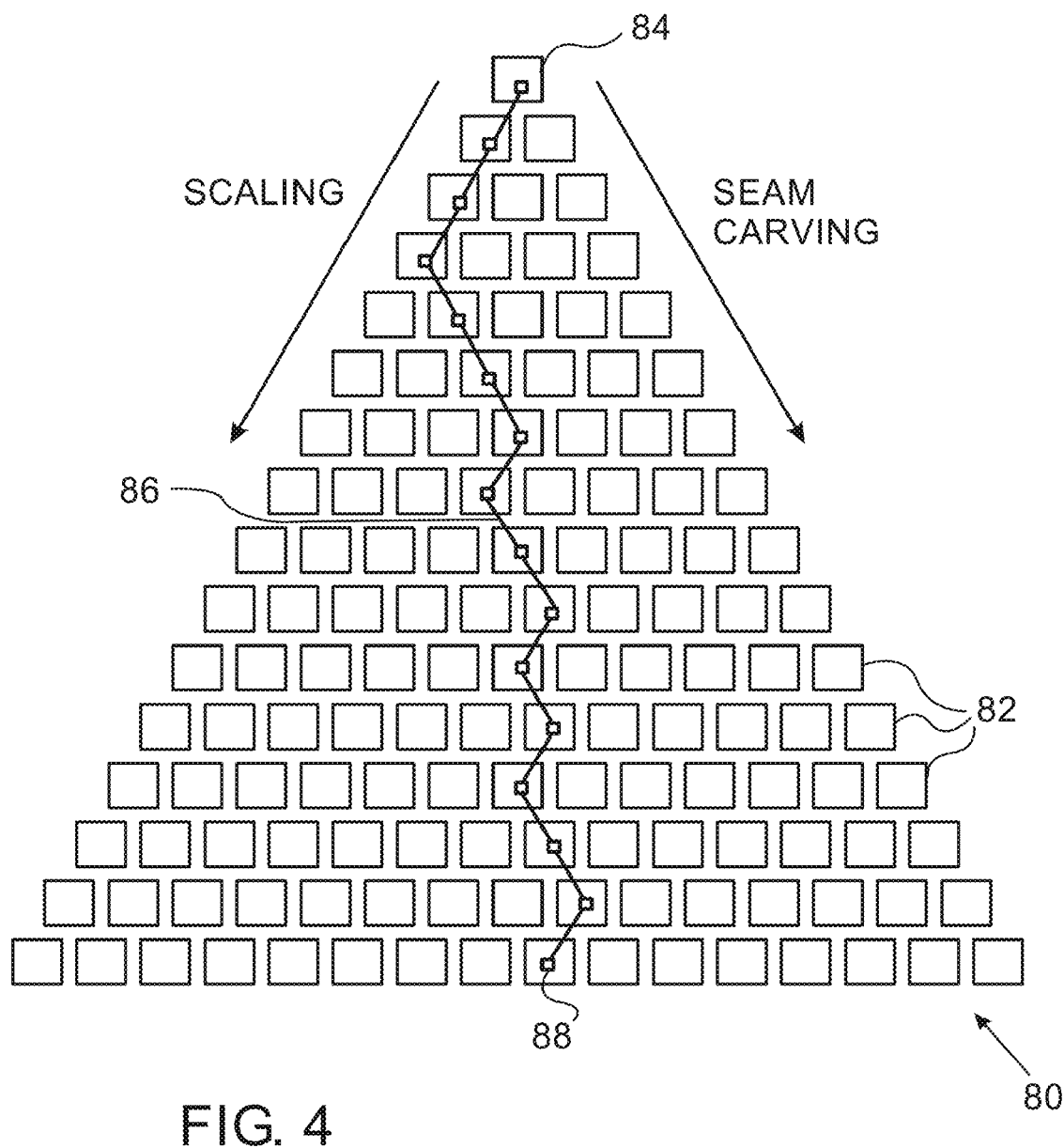
FIG. 4 is an illustration of a dynamic programming table used in a multi-operator image retargeting operation, in accordance with an embodiment of the present invention.

FIG. 4 is a schematic illustration of an example dynamic programming table 80, which is used to optimize a search for the best mixed path using two operators, in accordance with an embodiment of the present invention. Dynamic programming table 80 represents a two-dimensional search space, in which each point 82 corresponds to a target image resulting from a certain combination of retargeting operations. Starting with a source image 84, the two-dimensional search space represents potential target images generated by two retargeting operations, such as seam carving and scaling. Points in the two-dimensional search space are represented as a tree, wherein target image nodes are child nodes to a parent node representing a source image at that point in the two-dimensional space. Using an image distance calculation algorithm, a target image 88 is located in the two-dimensional space. A path 86 represents the sequence of multi-operator retargeting operations performed to arrive at the target image.

To find the optimal operator sequence, subsystem 42 starts with an empty sequence denoted by the point $(0, \ldots, 0)$ and cost 0 (e.g., image 84 in dynamic programming table 80). Next, module 72 applies each operator once and creates n sequences denoted by the points $(1, 0, \ldots, 0), \ldots, (0, \ldots, 0, 1)$ and computes costs $\{D(S,(O_i)(S))\}_{i=1}^n$ of applying operators $O_i$, $0 \leq i \leq n$ respectively on source image 84. Next, the cost of sequences $\sigma(2, 0, \ldots, 0), \ldots, \sigma(0, \ldots, 0, 2)$ is stored, but for each sequence containing the application of two distinct operators $O_{p1}$, $O_{p2}$ there are two possible sequences: $\sigma=(O_{p1}, O_{p2})$ or $\sigma=(O_{p2}, O_{p1})$. The two options are then checked, and only the one whose cost is smaller in the table at position $(\ldots, 0, 1, 0, \ldots, 0, 1, 0, \ldots)$ is retained, wherein the 1s appear in positions $p_1$ and $p_2$.

In general, to fill the entry $(p_i, \ldots, p_n)$, module 72 examines all its predecessor sequences in which the application of one of the operators was less by one. These correspond to points where one of the coordinates is less by one, which were already calculated and stored in table 80. These sequences are denoted for abbreviation by $\sigma_i = \sigma(p_1, \ldots, p_i-1, \ldots, p_n)$, $1 \leq i \leq n$. The operator $O_i$ is then appended to sequence $\sigma_i$ to get the new operator sequence denoted by $(\sigma_i \cup O_i)$, and this new sequence is applied to the source image 84, and finally the best one is chosen from:

$$i^* = \arg\min_{1 \leq i \leq n} D(S, \langle \sigma_i \cup O_i \rangle(S))) \qquad (2)$$

In general, the table structure is an n-dimensional simplex that is constructed in m stages.

Dynamic programming table 80 is an equilateral triangle, which is a 2D simplex. In practice, automatic retargeting module 72 typically uses a step size larger than one between each stage (usually 5 or 10), meaning each operator is applied more than once between stages. At the last stage, all points $(p_1, \ldots, p_n)$ for which $$\sum_{i=1}^{n} p_i = m$$

represent target images of size w'=w−m are placed as roots of the simplex tree. Automatic retargeting subsystem 72 chooses the target image that stores the smallest cost, i.e., is the least distant from the source image. To obtain the optimal sequence of retargeting operators $\langle O_1, \ldots, O_m \rangle$, automatic retargeting subsystem 72 backtracks to the first entry and in each step recovers the operator that was chosen. Although the example shown here is two-dimensional, the same sort of approach may be used in finding an optimal sequence of three or more retargeting operations.

Subject to the assumptions outlined above, the discrete optimization is guaranteed to find an optimal multi-operator sequence. However, these assumptions mean that automatic retargeting module 72 searches only in a sub-space of the resizing space and does not reproduce all images of the desired target size. A retargeted image may exist that is more similar to the source image. Furthermore, the definition of best results may change depending both on the user and on the goal for retargeting the image. Our research found that all users tend to use a combination of operators, but there is a large variance between different users' choices. Therefore, in addition to the automatic optimization method described above, manual retargeting subsystem 70 provides an interactive technique that allows users to explore a sub-space of retargeting possibilities in a simple manner, as described further hereinbelow.

Figure 5:
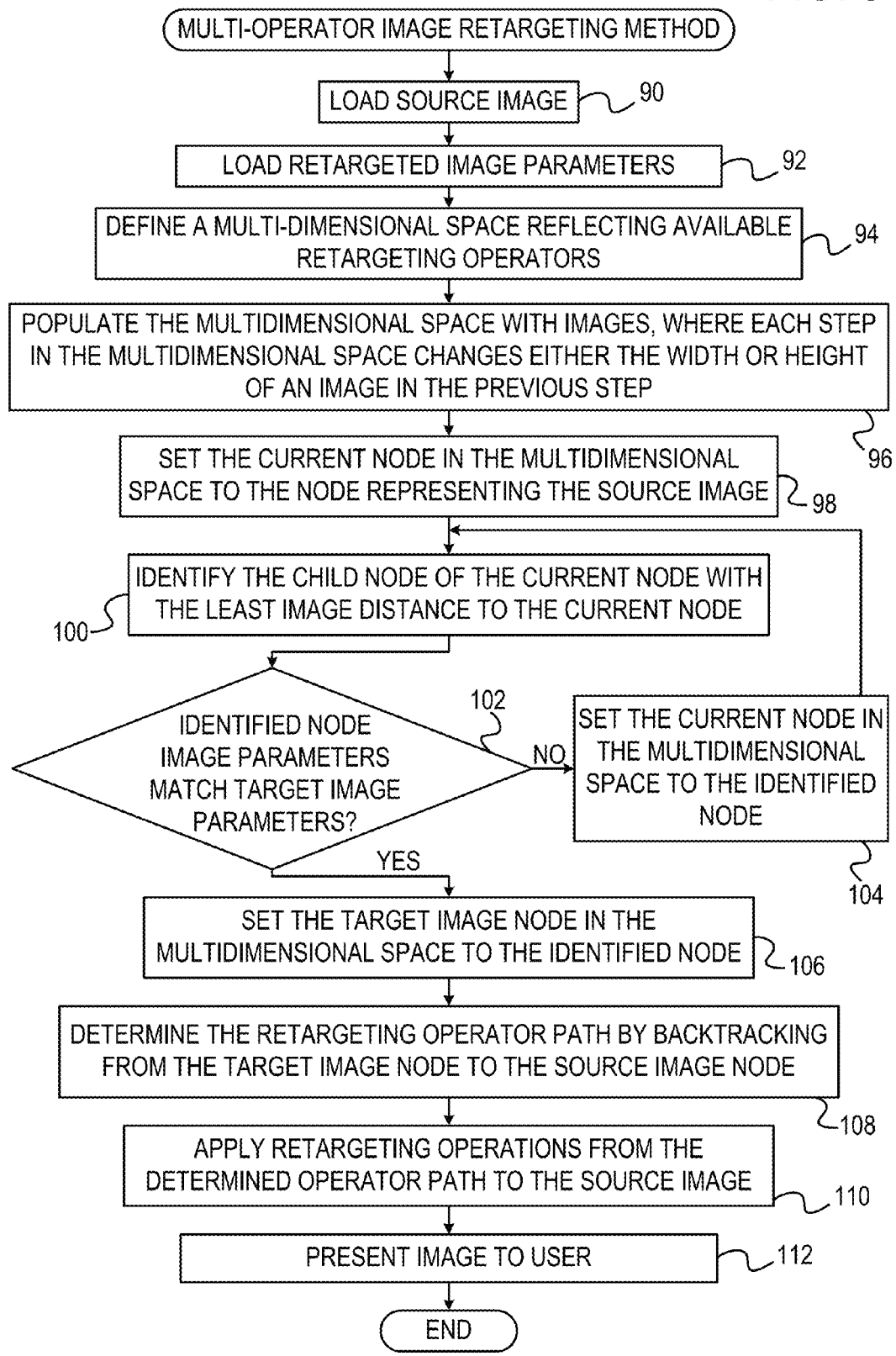
FIG. 5 is a flow diagram illustrating a multi-operator image retargeting method in accordance with an embodiment of the present invention.

FIG. 5 is a flow diagram illustrating the automatic multi-operator image retargeting method described above, in accordance with an embodiment of the present invention. First image retargeting subsystem 62 loads the source image (step 90) along with the retargeted image parameters (step 92). Image retargeting subsystem 62 then selects the retargeting operators, either automatically by automatic retargeting module 72, or based on user input via user interface 68 and manual retargeting module 70, thus defining a multi-dimensional space reflecting the available retargeting operators (step 94). For automatic retargeting, automatic retargeting module 72 populates the defined multi-dimensional space, whereby each step in the multi-dimensional space changes either (i.e. not both) the width or height of the image associated with the previous step (i.e. a parent node in the multi-dimensional space) via image processing subsystem 64 (step 96).

Automatic image retargeting module 72 then identifies the current node as the node representing the source image (step 98) and image distance calculation subsystem 66 identifies the child node (i.e. in the multi-dimensional space) of the current node with the smallest image distance to the current node (step 100). If the image associated with the identified node does not match the target image parameters (step 102) then automatic image retargeting module 72 sets the current node to the identified node (step 104), and the method returns to step 100. When the image associated with the identified node matches the target image parameters, automatic image retargeting module 72 sets the identified node as the target image node (step 106). Working backwards from the target image node to the source image node, automatic image retargeting module 72 determines the path (i.e. the sequence of retargeting operators) image processing subsystem 64 used to retarget the source image (step 108). Image processing subsystem 64 then applies the sequence of retargeting operators to the source image (step 110) and user interface 78 displays the retargeted image to the user (step 112).

Interactive Multi-Operator Retargeting

As discussed supra, an embodiment of the present invention utilizes a polynomial algorithm to automatically determine the optimal mixed multi-operator path. A mixed path is defined as a path where both the order of the operators and the number of times each operator is used is not known when starting an image retargeting process. Automatic retargeting module 72 determines the order of retargeting operators and how much each retargeting operator contributes to the retargeted image by identifying optimal path 84 through multi-dimensional search space 82.

Another approach to image retargeting is to allow an operator to define a path from the source image to the target image. This path may be a regular path, defined as a consecutive sequence of operations, one per operator. Each regular path comprises a specific order of retargeting operators, and can conveniently be expressed as $\langle k_1 \times O_{i_1}, \ldots, k_n \times O_{i_n} \rangle$, wherein $$\sum_{j=1}^{n} k_j = m, n \geq k_j \geq 0.$$

It then remains to be decided how much each operator contributes to the image retargeting process. This creates a one-to-one mapping between a point in the resizing space and a regular path. Fixing m in the formula above is equivalent to choosing a hyper-plane in the resizing space, and choosing how much each operator will contribute corresponds to choosing a point on this hyper-plane. This means that the optimal solution for this problem can be found using exhaustive search in $O(m^{n-1})$, which is polynomial in the size change m but exponential in the number of operators n. Since n is usually small (e.g., three or four operators) and m can be sampled in discrete steps, this search is feasible.

Regular paths also lend themselves to a simple interface that assists users search in this sub-space for desired results. First, the order of operators in the sequence is chosen ahead of time (e.g., $\langle k_1 \times SC, k_2 \times CR, k_3 \times \rangle$ or $\langle k_1 \times SL, k_2 \times SC, k_3 \times CR \rangle$), wherein CR is cropping, SL is scaling and SC is seam carving. Next, there is a slider governing the image size change m, and a slider for each operator separately. Since the contribution of all operators must sum to the total size change m, users must choose a coupling of a pair of sliders to change their value. Moving one in a positive direction will drive the other to move in the negative direction, and vice versa. Such an interface optionally enables using negative amounts of specific operators, i.e.

$$n \geq k_j \geq -n, \sum_{j=1}^{n} k_j = m.$$

A simpler user interface for the manual retargeting subsystem 40 is defined using just one slider for all operators by constraining $n \geq k_j \geq 0$ and fixing the order of operators to be $\langle k_1 \times SC, k_2 \times CR, k_3 \times SL \rangle$. This constrains the results achieved to be regular sequences of the type $\langle k_1 \times SC, k_2 \times CR, k_3 \times SL \rangle$. Although somewhat limiting, our research indicates that users found this method to be intuitive and productive.

FIG. 6 is a schematic representation of a multi-operator user interface 120 for retargeting an image 140, in accordance with an embodiment of the present invention. In this embodiment, there are separate slider controls for each image retargeting operation. User interface 120 comprises a slider 122 on a path 124, and an image retargeting operator selection section 126. The relative amounts of the operations are controlled by a slider 128 on path 130, a slider 132 on a path 134, and a slider 136 on a path 138.

In operation, slider 122 controls the image width or height of image 140, depending on the current value of dimension selector 142. Image retargeting operator selection section 126 defines what retargeting operators are currently enabled for use by the interface. Slider 128 controls seam carving, slider 132 controls cropping and slider 136 controls scaling. Coupling operators via image retargeting operator selection section 126 enables a user to visually examine the continuous tradeoff between the operators (e.g., between scaling and seam carving) for all image sizes.

In an alternative embodiment, sliders 128, 132 and 136 may be operated by the user independently. This option creates greater flexibility, and thus requires greater user expertise, but also gives the user full control over the path to be traversed in the multi-dimensional retargeting space. Specifically, the sequence of user inputs in moving the sliders determines the order of the retargeting operations that are to be applied to the source image. The user is thus able to define a non-monotonic path from the source to the desired target image, including backtracking when necessary.

FIG. 7 is a schematic representation of a regular-monotonic user interface 150 in accordance with an alternative embodiment of the present invention. User interface 150 comprises a slider 152 on a path 154, as well as a combined path 156 with sliders 158 and 160 on the combined path. The sliders are used to define the amounts of different retargeting operations for application to an image 168. Combined path 156 is divided into a seam carving sub-path 162, a cropping sub-path 164 and a scaling sub-path 166. In operation, slider 152 controls the image size and sliders 158 and 150 control the amount of each retargeting operation (i.e. cropping, scaling and seam carving) to be applied to the image.

This alternative embodiment pre-selects the retargeting operator ordering and restricts the order of operators in the path, using only either all negative or all positive size changes. The user manipulates slider 152 to control the target size, and sliders 158 and 160 choose the desired balance between the operators. In other words, movement of one of the sliders along path 156 causes image processing subsystem 64 to increase the proportion of one of the retargeting operations while decreasing the proportion of at least one other of the other operations. A user can move sliders 158 and 160 either individually or in tandem (i.e., when sliders 158 and 160 are immediately adjacent to one another, they can be moved as a single slider). Note that slider 152 resizes image 168 in a single dimension (i.e. width or height), but the selected dimension can be changed at any stage of retargeting.

In the embodiments of both of FIGS. 6 and 7, image retargeting subsystem 32 stores the path that the user creates (i.e. the sequence retargeting operators and their values) from the source image to the target image. This storage capability enables the user to backtrack and experiment with different operator sequences.

Multi-Operator Video Retargeting

Multi-operator image retargeting can be extended to video by first identifying key frames in the source video, either automatically or manually via user interface 68. Image retargeting subsystem 62 retargets each key frame, either manually via manual retargeting module 70 or automatically via automatic retargeting module 72. Typically, different amounts of the retargeting operations are applied respectively to different key frames. Once the key frames are retargeted, automatic retargeting module 72 interpolates the amount of each operator in the sequences from the two consecutive key frames to identify the multi-operator sequence to apply to each intermediate frame (i.e. the frames in the source video which are not key frames). For scaling, scaling module 75 changes the scale factor linearly. Seam carving module 76 also supports linear interpolation by interpolating the number of seams to be removed. For cropping, cropping module 74 separates the amount of cropping in each key frame into left and right cropping (or top and bottom) and interpolates linearly between each one separately.

Such sequence interpolations can also be used to insert virtual camera motion into the resulting video. For example, interpolating between cropping k columns on the left to cropping k columns on the right introduces a panning effect, while interpolating between different scaling levels may introduce either a zoom in or a zoom out effect.

Figure 8:
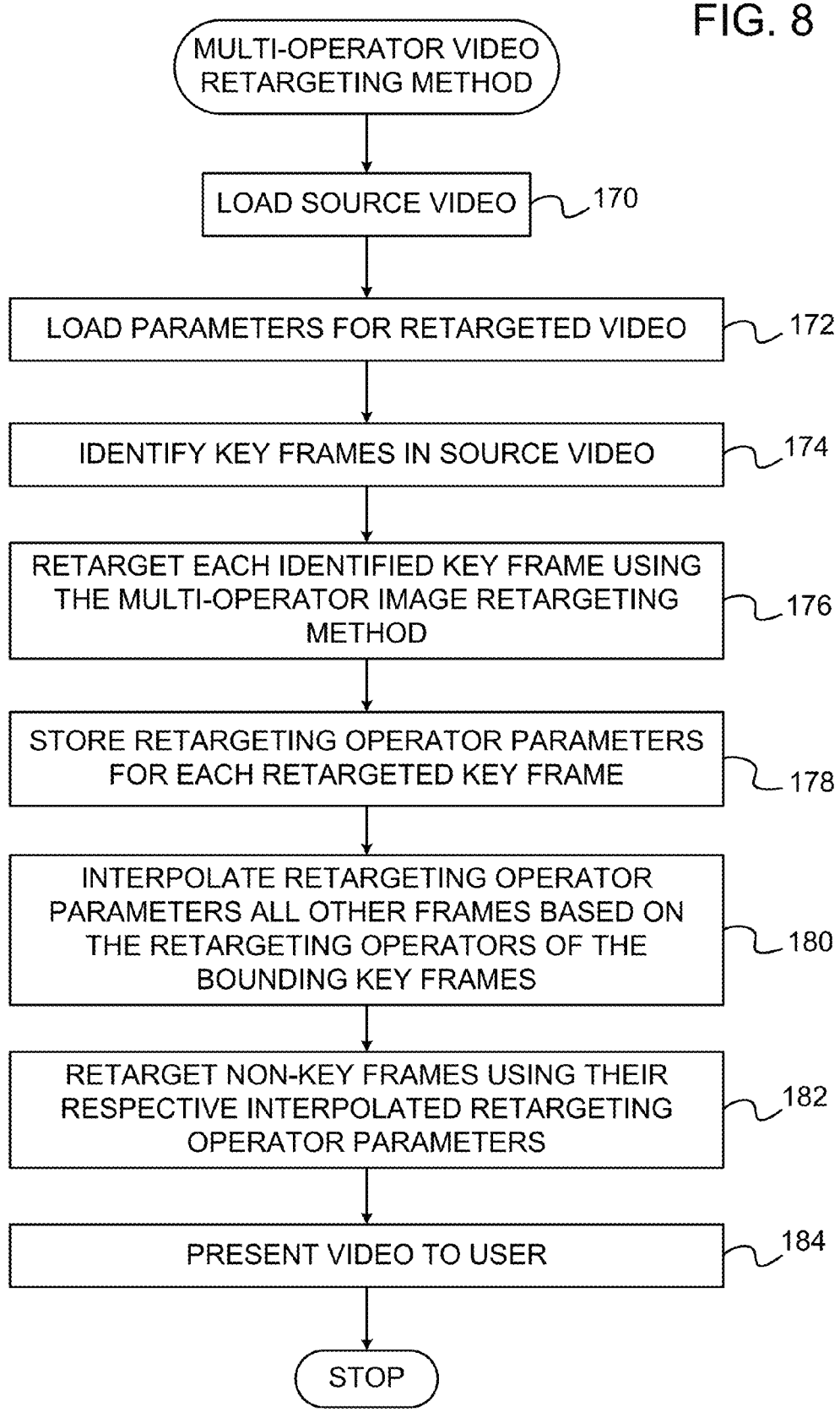
FIG. 8 is a flow diagram illustrating a multi-operator video retargeting method in accordance with an embodiment of the present invention.

FIG. 8 is a flow diagram illustrating a multi-operator video retargeting method, in accordance with an embodiment of the present invention. Image retargeting subsystem 62 loads the source video (step 170) and the parameters for the retargeted video (step 172). The key frames in the source video are identified, either via user interface 68 or via some other image processing means, as are known in the art (step 174). Image retargeting subsystem 62 retargets each identified key frame using combinations of different retargeting operations, as described above (step 176) and stores the key frame retargeting parameters (step 178).

Automatic retargeting module 72 interpolates the retargeting operator parameters for each non-key frame based on the retargeting operator parameters of the bounding key frames (step 180). Automatic retargeting system 72 then applies the interpolated retargeting operator parameters to each non-key frame (step 182) and user interface 68 then presents the retargeted video to the user (step 184).

Bi-Directional Warping

As discussed supra, an embodiment of the present invention provides a method for detecting similarity between two digital images called bi-directional warping (BDW). This method is useful particularly in measuring the similarity between different versions of the same image, and is thus used in the automatic image retargeting technique described above. BDW may also be applied, however, in other image matching applications. For example, it may be used to identify modified copies of a proprietary image that are transmitted over a network for purposes of copyright enforcement.

To measure the similarity between two images using BDW, image distance calculation subsystem 66 measures the similarity between every row (or column), and then combines these row (or column) measures to give a measure of the distance between the images. Various modes of combination are possible. For example, image distance calculation subsystem 66 may take the maximum alignment error as the distance between the images. Another option is for image distance calculation subsystem 66 to take the mean or the weighted mean of the alignment errors. Although BDW may be applied to rows (or columns) of individual pixels, the method is typically applied to rows (or columns) of patches (i.e., a two-dimensional matrix of pixels), as patches can better capture spatial information. While the term matrix conventionally includes multiple rows and columns, in the context of the present description of an algorithm implementing an embodiment of the present invention and in the claims, a matrix can also comprise a single row and/or column (i.e., it may consist of only a single pixel).

BDW is a variant of Dynamic Time Warping (DTW), which is described, for example, by Sakoe, in "Dynamic programming algorithm optimization for spoken word recognition," *IEEE Transactions on Acoustics, Speech, and Signal Processing* 26, pages 43-49 (1978), which is incorporated herein by reference. DTW is an algorithm for measuring similarity between two one-dimensional signals or time-series. The DTW algorithm finds the optimal matching between two one-dimensional (D) sequences t and s by non-linearly warping one onto the other, under the following constraints: (1) boundary constraints: the first and last elements of t must be matched to the first and last elements of s, respectively, (2) all elements of t and s must be used in the warp path, and (3) the warp must be monotonic, meaning that matching cannot go backward, thus preserving the sequence order. The warp is symmetric, i.e. DTW(s,t)=DTW(t,s), and the warp can contain both one-to-many and many-to-one matchings. This algorithm can be solved efficiently using dynamic programming, in $O(|s||t|)$ time and space.

Bi-Directional Warping relaxes the first two constraints of DTW in order to facilitate matching of images that may have been cropped, seam-carved or otherwise retargeted. First, BDW allows the algorithm to insert gaps in the warp and also removes the boundary constraints. Second, for each element (pixel or patch) in the source image, the goal of BDW is to find a single match that minimizes the warping cost under the ordering constraint. Typically, the source image patches are the same size (in pixel dimensions) as the target image patches. Patches in both the source or target image can be either adjacent, overlapped or spaced apart with respect to one another.

Therefore, one-to-many matchings from the source to target image are disallowed. On the other hand, image distance calculation subsystem 66 allows many-to-one matchings from source to target image as this feature assists in finding better order-preserving matches. The use of gaps and many-to-one matchings, in distinction to conventional DTW approaches, creates an Asymmetric-DTW (A-DTW) measure to be used in the BDW algorithm, as defined in Equation 1, infra. The sequences s and t in the equation can be either 1D arrays of pixels, or 1D arrays of patches, as noted above, and the distance d(s[i],t[j]) between an element of s and an element of t is taken to be the sum-of-square differences of pixel values, but can also be any other measure of distance between two patches. Given images S and T of height h, let Si, Ti denote row i in images S and T, respectively. The BDW distance is determined by combining the two directions of asymmetric alignment measures A-DTW(S,T) and A-DTW(T,S). For example, $$BDW(S, T) = \frac{1}{N_S}\sum_{i=1}^{h} A\text{-}DTW(S_i, T_i) + \frac{1}{N_T}\sum_{i=1}^{h} A\text{-}DTW(T_i, S_i) \quad (1)$$

computes an average, wherein N equals the number of elements in each array.

The following table lists a sample algorithm implementing a bi-directional warping image similarity method, in accordance with an embodiment of the present invention. The algorithm finds the distance between array of patches s having |s| elements (each array in image s represents one row or column) and array of patches t having |t| elements (each array in image t represents one row or column). A table M is first defined as a two-dimensional array of |s|+1 and |t|+1 elements, respectively. After initializing table M, the algorithm computes each element M[i,j] with the appropriate distance value.

Algorithm 1 Asymmetric-DTW(s[1..|s|],t[1..|t|])

```
1: allocate M[|s| + 1][|t| +1]
2: M[0, 0] := 0
3: for i = 1 to |s| do
4: M[i, 0] := ∞
5: for j := 1 to |t| do
6: M[0,j]:=0
7: for i := 1 to |s| do
8: for j := 1 to |t| do
9: M[i, j] := min(M[i – 1,j – 1] + d(s[i],t[j]),
                 M[i, j – 1],
                 M[i – 1,j]+ d(s[i],t[j]))
10: return M[|s|, |t|]
```

In practice, when combining the two directions of the A-DTW (i.e., from s to t and from t to s) in Equation 1 to create the BDW measure, the maximum operator often works better than the mean in image distance calculation subsystem 66. This is because while most elements are usually well aligned, a small number of deformed elements are enough to cause a visual artifact. Therefore, instead of returning the cost at element M[|s|,|t|] as the A-DTW result, the algorithm uses backtracking to find the maximum entry in array M. To find the maximum distance between elements from s and t, image distance calculation subsystem 66 tracks the alignment of the elements that are matched by the A-DTW algorithm while filling table M, and then backtracks from M[|s|,|t|] to M[1,1], according to the decisions made along the path and finds the maximum entry M[i,j]. This entry is returned by the A-DTW algorithm 1 as the cost of the asymmetric DTW.

Figure 9:
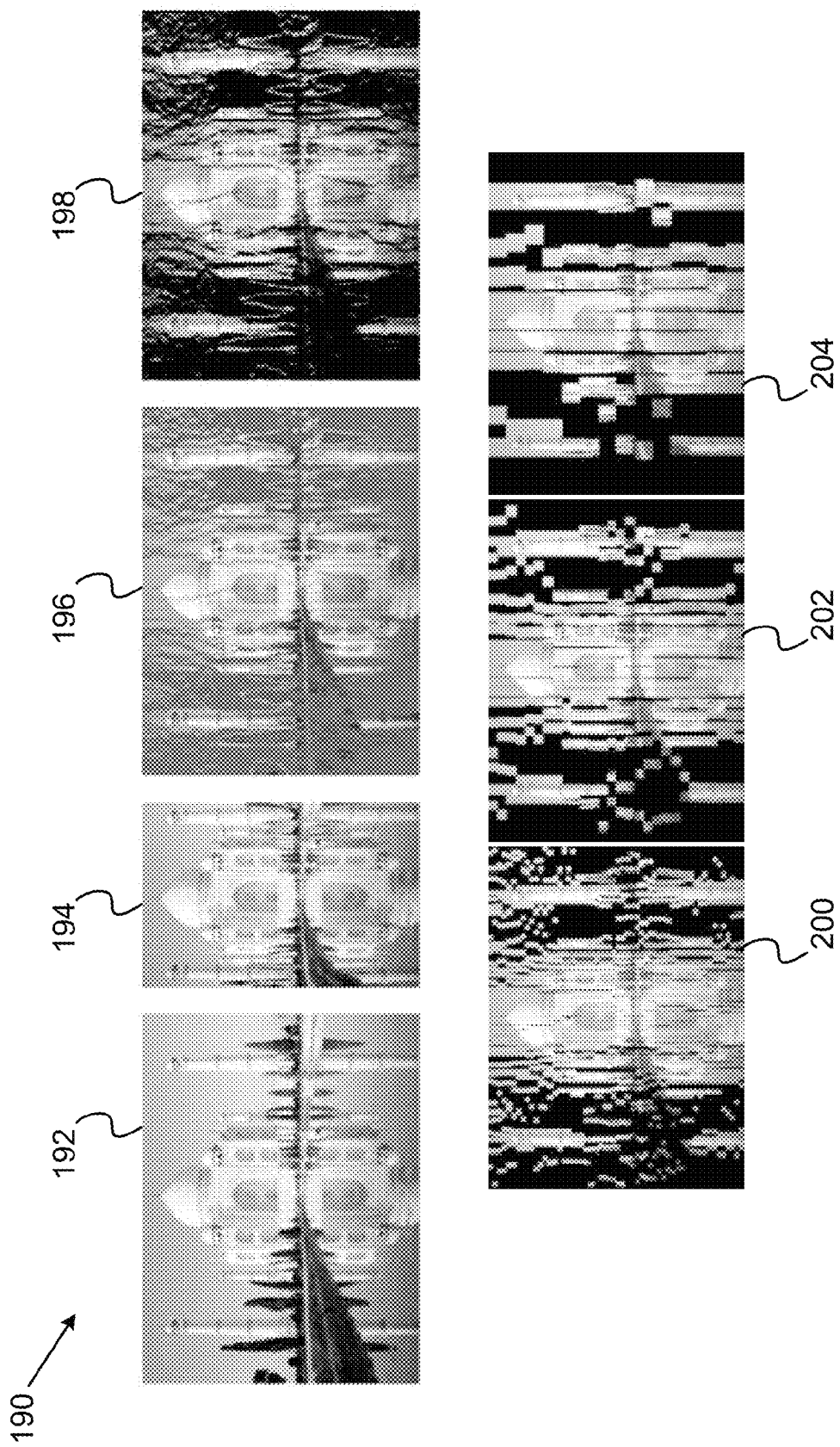
FIG. 9 is a series of images illustrating the results of aligning an image with its retargeted version using several patch sizes, in accordance with an embodiment of the present invention.

FIG. 9 is a series 190 of images illustrating results of aligning a source image 192 with a retargeted image 194 using A-DTW and several different patch sizes, in accordance with an embodiment of the present invention. Image 194 in this example has been retargeted using seam carving. Image 196 shows the seams (as black areas) that were removed in transforming image 192 to image 194. In this example, the horizontal dimension of the source image was reduced, without changing the vertical dimension. Images 198, 200, 202 and 204 show the results of matching patches of different sizes in retargeted image 194 to corresponding patches in source image 192, as part of the BDW process described above.

As discussed supra arrays representing images used by the BDW algorithm can comprise either individual pixels or patches. Black pixels in image 198 and black patches in images 200, 202 and 204 represent gaps in the A-DTW matching of image 194 to image 192. Image 198 shows optimal matching (in terms of accuracy) using pixels. Although pixel-level matching is optimal in this sense, it is also the most time-consuming. Image 200 shows A-DTW matching of image 194 to image 192 wherein each array element comprises an 8×8 patch of pixels. Image 202 shows A-DTW matching of image 194 to image 192 wherein each array element comprises a 16×16 patch of pixels. Finally, image 204 shows A-DTW matching of image 194 to image 192 wherein each array element comprises a 32×32 patch of pixels.

In practice, the BDW calculation may combine the scores of two or more scales of patches. In accordance with an embodiment of the present invention, BDW uses two alignments of the source image to the retargeted image and vice versa. The distance is the combined (e.g., maximal or mean) matching cost of elements in the two.

Figure 10:
FIG. 10 is a series of images illustrating a method for assessing image similarity via bi-directional warping, in accordance with an embodiment of the present invention.

FIG. 10 is a series 210 of images illustrating the results of aligning an original image (S) 212 with a retargeted image (T) 214 (by seam carving) using bi-directional A-DTW, in accordance with an embodiment of the present invention. Image 216 shows the A-DTW matches when comparing image T to image S (i.e. (A-DTW (T, S)), and image 218 shows the A-DTW matches when comparing image S to image T (i.e. A-DTW (S, T)). These two comparisons are combined to calculate the BDW image similarity measure.

As in series 190, black patches in images 216 and 218 represent gaps in the matching. The alignment shown in image 216 reveals that the retargeting used a combination of cropping (gaps on the sides of the alignment), scaling (uniform spacing between patches in the middle) and seam carving (large gaps in the middle).

For images S of size h×w and T of size h'×w', w'<w, BDW is $O(hw^2)$ in time, and $O(w^2)$ in space. The inventors have found that the BDW between two 640 by 480 (pixels) images, using 7 by 7 (pixels) patches, takes about five seconds to compute on a 1.8 GHz dual-core laptop with 2 GB of RAM. For further speed-up, automatic retargeting module 72 can limit the search space to a narrow window, or band, within dynamic programming table 82. In addition to the increased performance, this limitation can also be useful in preventing "pathological" warps. Such pathological warps may occur, for example, when image distance calculation subsystem 66 maps many patches of one image to the same patch in the other, or when the warp contains too many gaps.

The BDW image similarity method described above searches for matches along a single direction (column or row) of the source and target images. This unidirectional approach is sufficient for assessing results of retargeting that are created by operators which are separable in dimension. It is also efficient to compute when using an efficient matching algorithm, such as that described above. The BDW image similarity method achieves optimal alignment of source and target images that is order-preserving. Order is important when assessing retargeting results, in order to avoid structural modifications of the image. Finally, the many-to-one alignment provided by A-DTW also supports repetitive content, albeit in an order-preserving manner.

Figure 11:
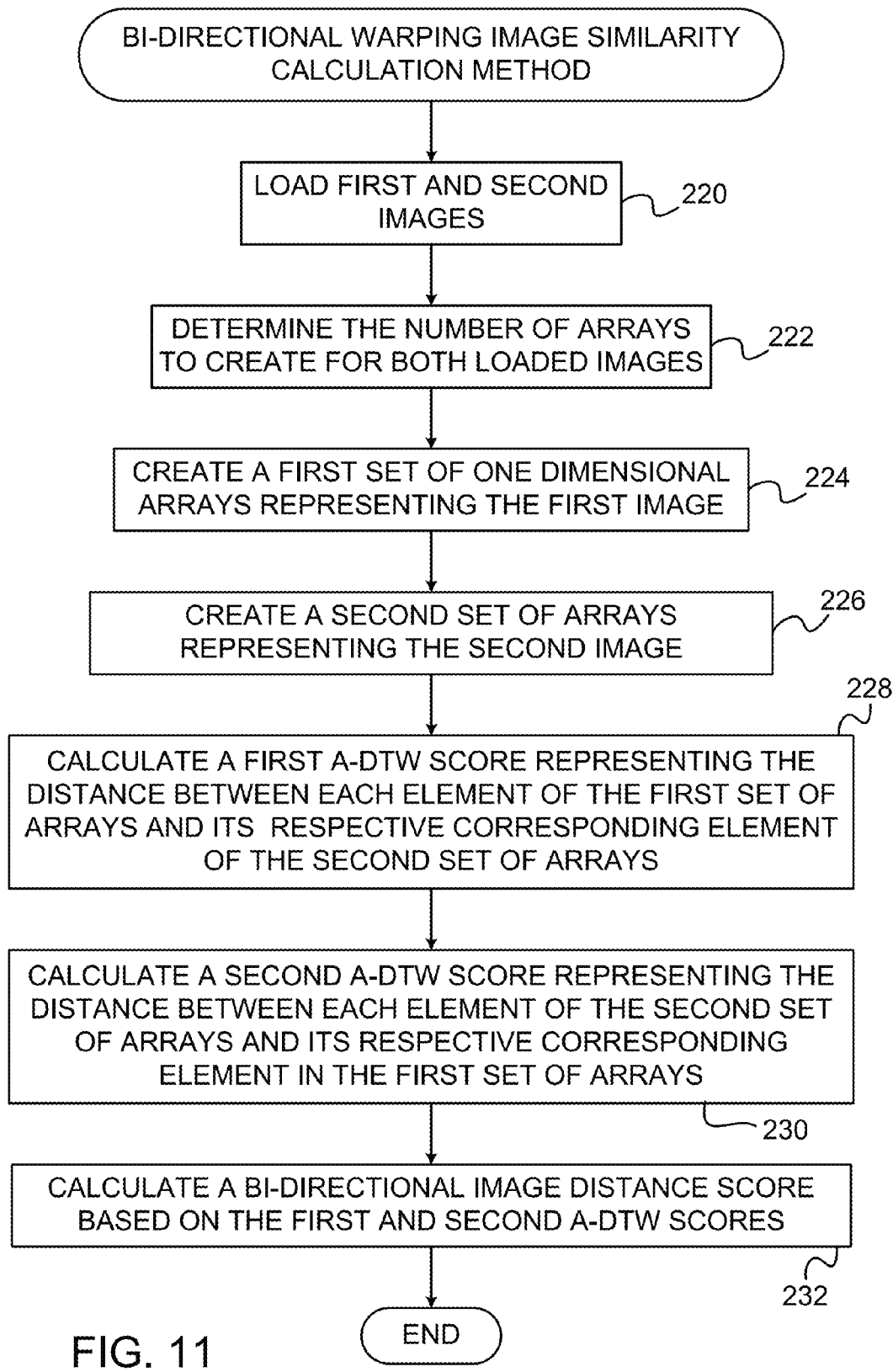
FIG. 11 is a flow diagram illustrating a bi-directional warping image similarity calculation method, in accordance with an embodiment of the present invention.

FIG. 11 is a flow diagram illustrating the bi-directional warping image similarity calculation method, in accordance with an embodiment of the present invention. Image retargeting system 62 loads the images to be compared (referred to for convenience as first and second images) (step 220). Image distance calculation subsystem 66 determines the number of single dimensional arrays to be created for both images (step 222). This determined number represents the number of rows or columns each image is divided into. The number is dependent on the size of the image and the number of pixels in each patch comprising each element of the arrays.

Image distance calculation subsystem 66 creates first set of one-dimensional arrays representing the first image (step 224) and a second set of one-dimensional arrays representing the second image (step 226). Subsystem 66 then calculates a first A-DTW score representing the image distance between each element of the first set of arrays and a respective corresponding element in the second set of arrays (step 228), and a second A-DTW score representing the image distance between each element of the second set of arrays and a respective corresponding element in the first set of arrays (step 230). Since the first and second images can be of different sizes and dimensions, A-DTW does not require that each element in the first array is matched to an element in the second array, and vice versa (including the first and last elements of each array). Finally, image distance calculation subsystem 66 combines the first and second A-DTW scores, yielding a BDW image warp score (step 232).

The BDW image similarity method described above is operative to define a unique fingerprint for an image or a video (i.e. media). The fingerprint can be useful in detecting similarities in retargeted media.

The A-DTW framework presented above supports operators that resize images in one direction (either horizontally or vertically). If the source and target image have the same height but different widths, then the A-DTW framework presented above compares rows of the source and target images. If, on the other hand, the source and target image have the same width but different heights, then the A-DTW framework presented above compares columns of the source and target images.

When images are retargeted both horizontally and vertically, a heuristic extension of the above one-dimensional solution may be used. In this solution, A-DTW is recursively applied to the rows (or columns, as necessary). The two-dimensional version of DTW is commonly known as Dynamic Planar Warping (DPW), and its definition is similar to its one-dimensional counterpart.

By recursively applying Asymmetric-DTW on the rows of the image, the heuristic extension of the one-dimensional solution establishes the cost of matching row i of S to row j of T as the A-DTW distance between them (i.e. S and T), thus dividing the two-dimensional problem to a collection of one-dimensional ones. This results in a two-dimensional order-preserving mapping between the two images that is optimal under this rigid row-to-row alignment. Although this method will not estimate correctly all possible transformations, it has been found to produce a good approximation for assessing image similarity.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

The invention claimed is:

1. A method for image processing, comprising:
 receiving in a computerized image processor a source image having a source size and a definition of a target size that is different from the source size;
 defining a plurality of different sequences of two or more different image retargeting operations that when applied to the source image, generate respective target images of the target size;
 automatically testing, using the image processor, the different sequences by measuring respective similarities of the respective target images to the source image;
 selecting one of the sequences responsively to the similarities; and
 applying the selected one of the sequences to the source image, using the image processor, in order to generate a target image.

2. The method according to claim 1, wherein the image retargeting operations are selected from a group of the operations consisting of scaling, cropping, seam carving, non-homogeneous scaling, image warping, and segmentation and recomposition.

3. The method according to claim 1, wherein defining the plurality of the different sequences comprises recording the sequences in a dynamic programming table representing a multi-dimensional space, and wherein selecting the one of the sequences comprises choosing a path through the space corresponding to the selected one of the sequences.

4. The method according to claim 1, wherein automatically testing the different sequences comprises computing a respective measure of a distance between the source image and each of the target images.

5. The method according to claim 4, wherein computing the respective measure of the distance comprises applying a bidirectional warping operation to the source and target images.

6. A computer program product for image processing, the computer program product comprising:
 a non-transitory computer usable medium having computer usable code embodied therewith, the computer usable program code comprising:
 computer usable code configured for receiving in a computer a source image having a source size and a definition of a target size that is different from the source size;
 computer usable code configured for defining a plurality of different sequences of two or more different image retargeting operations that when applied to the source image, generate respective target images of the target size;
 computer usable code configured for automatically testing the different sequences by measuring respective similarities of the respective target images to the source image;
 computer usable code configured for selecting one of the sequences responsively to the similarities; and
 computer usable code configured for applying the selected one of the sequences to the source image in order to generate a target image.

7. The product according to claim 6, wherein the image retargeting operations are selected from a group of the operations consisting of scaling, cropping, seam carving, non-homogeneous scaling, image warping, and segmentation and recomposition.

8. The product according to claim 6, wherein defining the plurality of the different sequences comprises recording the sequences in a dynamic programming table representing a multi-dimensional space, and wherein selecting the one of the sequences comprises choosing a path through the space corresponding to the selected one of the sequences.

9. The product according to claim 6, wherein automatically testing the different sequences comprises computing a respective measure of a distance between the source image and each of the target images.

10. The product according to claim 9, wherein computing the respective measure of the distance comprises applying a bidirectional warping operation to the source and target images.

11. An image processing apparatus, comprising:
a memory; and
an image processor, which is configured to
   receive into the memory a source image having a source size and a definition of a target size that is different from the source size,
   define a plurality of different sequences of two or more different image retargeting operations that when applied to the source image, generate respective target images of the target size,
   automatically test the different sequences so as to measure respective similarities of the respective target images to the source image,
   select one of the sequences responsively to the similarities; and
   apply the selected one of the sequences to the source image, in order to generate a target image.

12. The apparatus according to claim 11, wherein the image retargeting operations are selected from a group of the operations consisting of scaling, cropping, seam carving, non-homogeneous scaling, image warping, and segmentation and recomposition.

13. The apparatus according to claim 11, wherein the image processor is configured to record the sequences in a dynamic programming table representing a multi-dimensional space, and to choose a path through the space corresponding to the selected one of the sequences.

14. The apparatus according to claim 11, wherein the image processor is configured to test the different sequences by computing a respective measure of a distance between the source image and each of the target images.

15. The apparatus according to claim 14, wherein computing the respective measure of the distance comprises applying a bidirectional warping operation to the source and target images.

* * * * *